FIG. 6
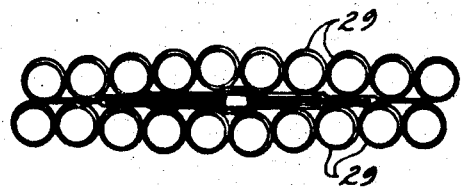
FIG. 7
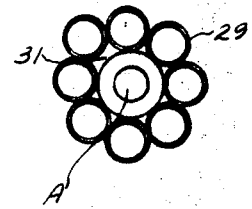
FIG. 8
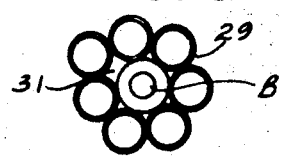
FIG. 9
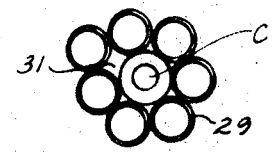
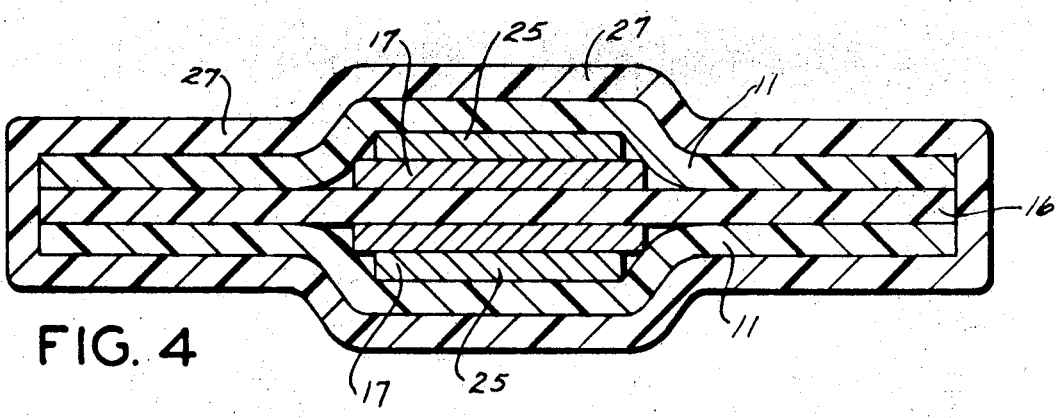
FIG. 4
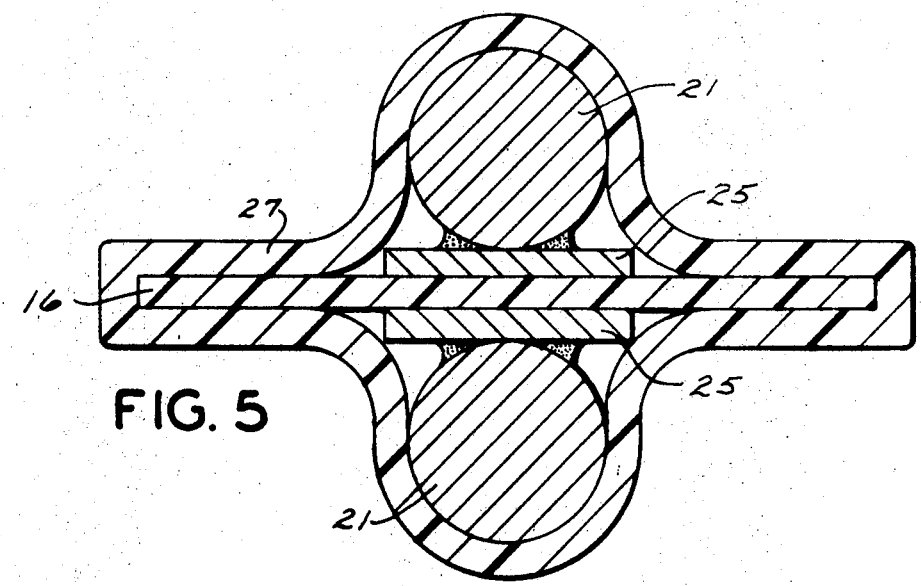
FIG. 5

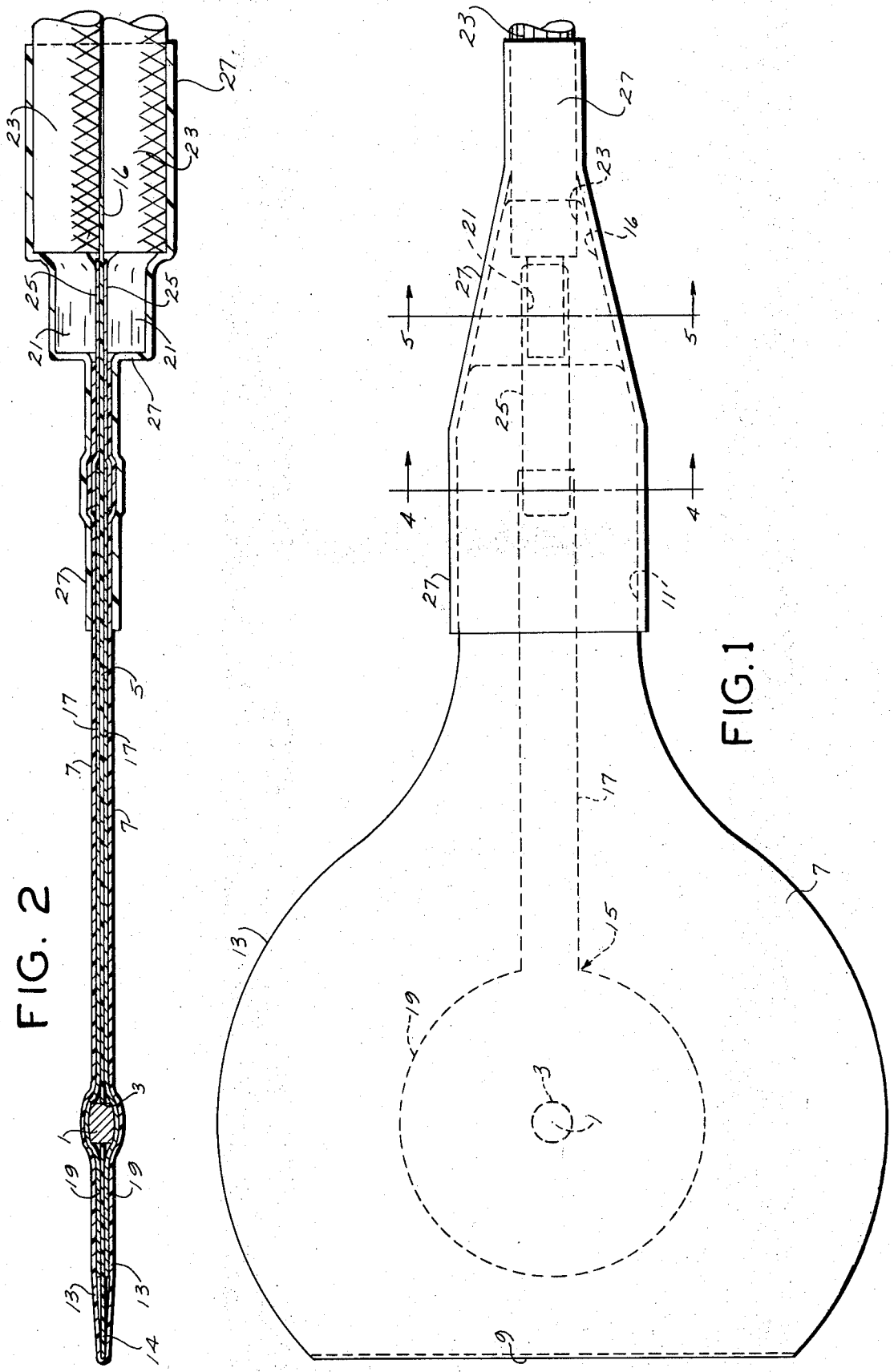

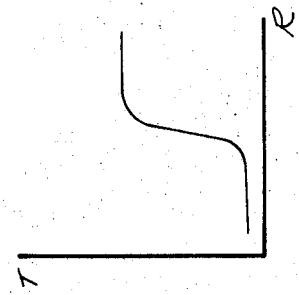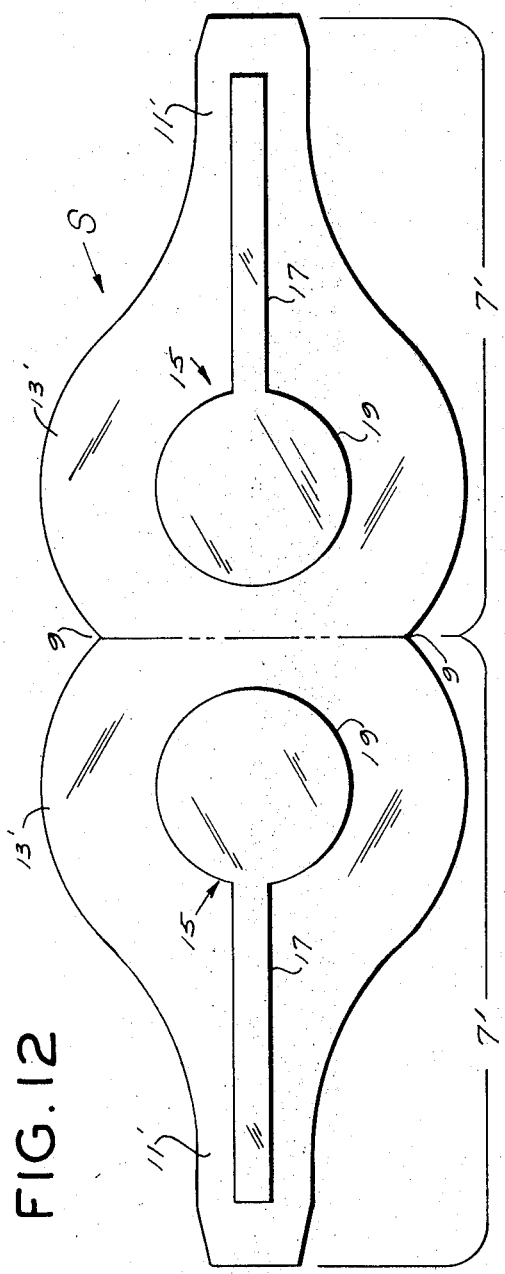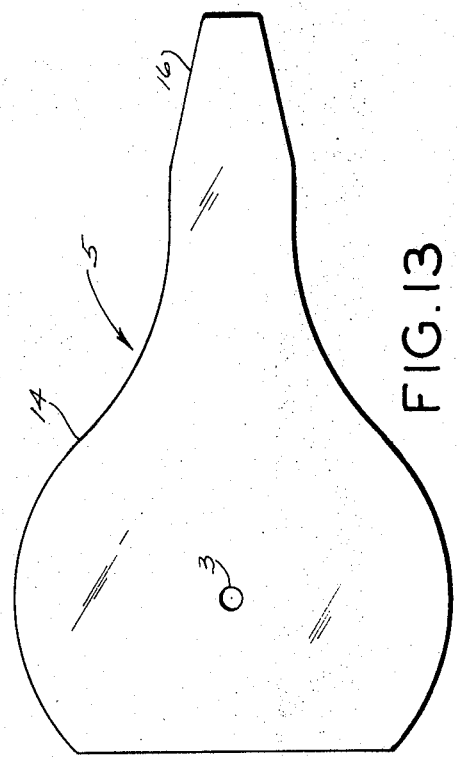

United States Patent Office 3,521,212
Patented July 21, 1970

3,521,212
ELECTRIC MOTOR PROTECTION SENSOR
Joseph W. Waseleski, Jr., Mansfield, Francis P. Buiting, Plainville, and Lyle E. McBride, Jr., Norton, Mass., assignors to Texas Instruments Incorporated, Dallas, Tex., a corporation of Delaware
Filed June 21, 1968, Ser. No. 739,048
Int. Cl. H01c 7/04; H02h 5/04; G01k 7/22
U.S. Cl. 338—25                                14 Claims

ABSTRACT OF THE DISCLOSURE

A small thermistor of low thermal inertia is carried in an opening in an inner thin layer of flexible high-temperature insulating material so as to expose portions of the thermistor on opposite sides of this layer. Outer thin layers of similar insulating material sandwich this inner layer and the thermistor. A vapor-deposited thin and flexible foil of copper is carried on the inside of each outer insulating layer and is soldered to an adjacent end of the thermistor. The copper foil serves as a conductor of heat and electricity to the thermistor. The inner and outer layers of the insulating material are bonded to one another around the foils to provide a protective seal around the foils. Each conductive foil is shaped with an enlarged head portion extending from the end of the thermistor and with a narrow stem for making electrical connections with terminals of signal-receiving leads from a control circuit for deexciting the motor when it approaches a damaging temperature. The three insulating layers are also formed with enlarged head portions surrounding head portions of the foils and with stems covering the foil stems. Their head portions, having extensive areas, make them good collectors of heat for delivery to the foil heads which in turn deliver this heat to the thermistor. A heat-shrunk insulating sleeve surrounds the connections between the stems and said terminals.

---

Various prior arrangements for accomplishing motor protection are shown in U.S. Pats. 3,246,183 and 3,183,-383. Other arrangements have also been proposed employing thermistors, rather than thermostatic switches such as shown in said patents, but none have been as effective as the arrangements disclosed herein. Among the advantages of the invention are (a) the ability to obtain a very short time constant of thermal response by the thermistor to minimize overshoot of motor heating after a signal has been received to disconnect the motor; (b) reduction in so-called scatter in the time constant in various applications; and (c) structural arrangements for low-cost manufacture.

Referring to the drawings,

FIG. 1 is a greatly enlarged plan view of a device made according to the invention;

FIG. 2 is a longitudinal section taken on line 2—2 of FIG. 1;

FIG. 3 is an illustrative chart showing typical relationships between resistance and temperature of the thermistor employed;

Figure 10:
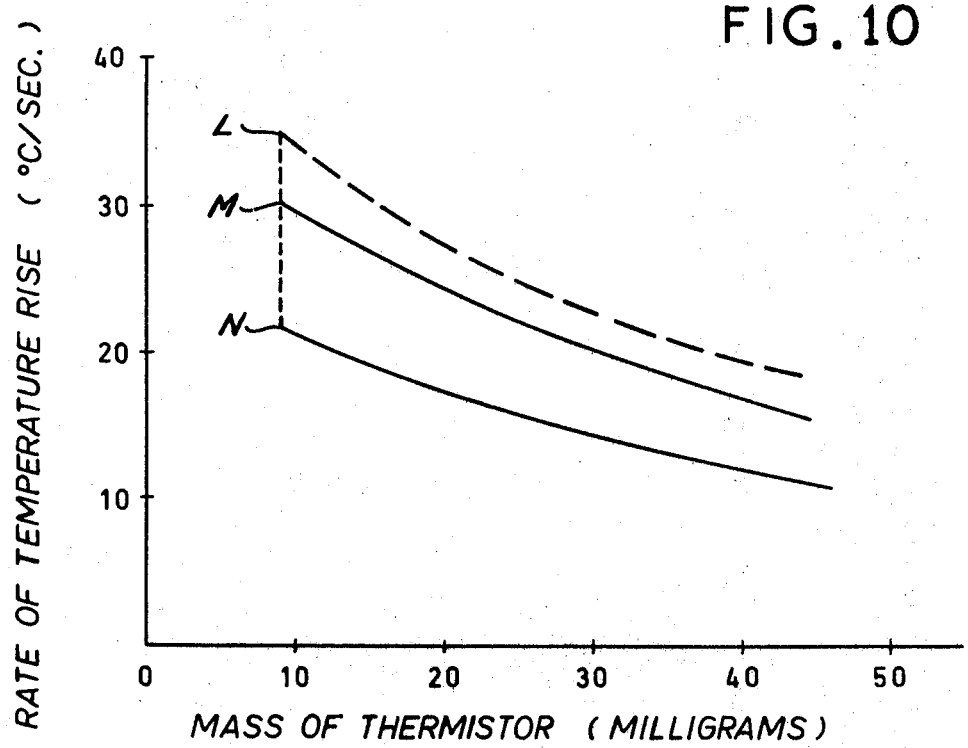
Figure 11:
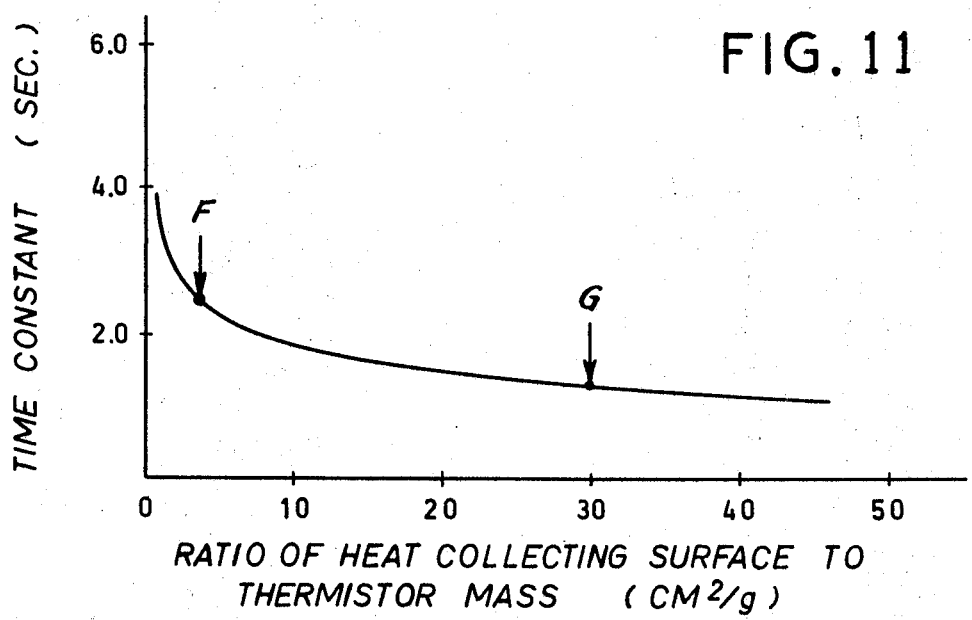

FIGS. 4 and 5 are further enlarged cross sections taken on lines 4—4 and 5—5 respectively of FIG. 1;

FIG. 6 is a diagrammatic cross section illustrating the nesting characteristics of our new protector between typical layers of motor windings;

FIGS. 7–9 are diagrams illustrating nesting characteristics of certain prior motor protectors;

FIG. 10 is a chart relating masses of thermistors to their rates of temperature rise;

FIG. 11 is a chart showing how the time constant of response is decreased by use of the present invention;

FIG. 12 is a plan view of a connected unfolded pair of outer insulating layers, showing separate vapor-deposited foils of copper thereon; and FIG. 13 is a plan view of a perforated insualting inner layer before being sandwiched between folded outer layers.

Corresponding reference characters indicate corresponding parts throughout the several views of the drawings.

Referring now more particularly to FIGS. 1–5, numeral 1 indicates a thermistor composed of a small pellet of semiconductive material having a selected positive or negative temperature coefficient of resistance. Preferably, for example, the thermistor, over a limited portion of its temperature range T, changes resistance R more rapidly than elsewhere in the temperature range. This is illustrated in FIG. 3. Appropriate materials for making it are, for example, a lanthanide-doped barium titanate ($BaTiO_3$), barium strontium titanate ($BaSrTiO_3$), barium lead titanate ($BaPbTiO_3$) or the like. The size of the thermistor should be small so as to have low thermal inertia but will vary somewhat according to the electrical parameters of the motor control system in which it functions as a sensor of temperature. An example is a pellet .050″ in length and .070″ in diameter. Appropriate ranges of these dimensions are approximately .040″–.060″ for the length, and .050″–080″ for the diameter.

The thermistor 1 is held in a small opening 3 of a thin layer 5 of insulating material. This material must be capable of withstanding the substantially elevated temperatures which might be imposed thereon by an overheating motor. A preferred material is a polyamide resin such as sold under the trade name "Kapton." Other materials useful in some cases are polyethylene tetraphthalate such as sold under the trade name "Mylar," or fluorinated aliphatic hydrocarbon such as tetrafluoroethylene such as sold under the trademark "Teflon." An appropriate thickness for layer 5 is in the range of approximately two to six mils. At numerals 7 (FIGS. 1–5) are shown two outer layers of the same or similar material in approximately the same thickness range. These are formed from symmetrical leaves 7′ of a sheet S (FIG. 12) which is subsequently folded on line 9 so that leaves 7′ become the outer layers 7 (FIGS. 1–5).

Each layer 7 includes a narrow stem 1 and a head 13. These are numbered 11′ and 13′ in the prefolded condition of FIG. 12. Before folding sheet S (FIG. 12) there is vapor-deposited upon it a pair of separate thin foils 15 composed of electrically conductive and heat conductive material, copper being preferred. Appropriate thickness for each foil 15 is in the range of .40 to .75 mil. Vapor deposition may conveniently be accomplished through an appropriate stencil, as known to those skilled in the art.

The layer 5, as shown in FIG. 13, has the same general outline as one-half the outline of sheet S illustrated in FIG. 12. It has an enlarged head 14 and a narrow stem 16. Layer 5 is sandwiched between layers 7 and marginally register therewith when the latter are folded on line 9—9. Part 5 then becomes an inner insulating layer between foils 15 with the outer insulating layers 7 carrying the foils (FIGS. 1, 2 and 12).

The layers 5 and 7 are bonded together around foils 15. An apropriate bonding material is a heat-sealable fluorinated aliphatic hydrocarbon such as "Teflon."

Each vapor-deposited layer or foil 15 has in part the shape of a stem 17 which is sandwiched between the stem shape 16 of the central layer 5 and the stem shape 11 of one layer 7. One end of each conductive foil stem 17 is terminated by an enlarged head portion 19 which is soldered to one end of the thermistor 1. A ½″ diameter for each head is appropriate. An appropriate solder is a gold-tin eutectic containing 80% gold and 20% tin.

At numerals 21 are shown a pair of terminal portions of insulated wires 23 in a control circuit designed to receive a voltage signal from the thermistor 1 when the motor approaches an unsafe temperature. In response to such a signal the control circuit through suitable relay means disconnects the motor from its power source. Further details of the required circuitry are not shown, being well known in the art.

Conductive tabs 25 which are more rugged than the foils 15 are preconnected to their stems 17 by appropriate factory welding techniques suitable for preventing damage to the thin foils 15. The tabs 25 provide means for making soldered conductive connections with the round-wire constituting the terminal portions 21 of wires 23.

At numeral 27 is indicated a heat-shrunk insulating protective sleeve covering the connections between the foil stems 17 and terminals 21. This sleeve extends to surround the end part of the insulation of wires 23 and to surround the end parts of the insulating stems 11 and 16. The preferred material for this sleeve 27 is cross-linked preexpanded polyethylene tetraphthalate such as sold under the trademark "Mylar." Before making the wire connections with the foil stems 17, the sleeve 27 is slipped back over the insulation 23. Then the electrical connections are made between terminals 21 and tabs 25. The sleeve 27 is then slipped into the final position it is to take and heated. This causes it to shrink to form a tightly clinging sealing jacket around the connection between the terminals 21 and tabs 25. Other materials which may be cross-linked, expanded and then shrunk are polyamide resins, such as sometimes sold under the trade name "nylon," or said "Teflon."

The protection sensor above described has various advantages as shown in the FIG. 6 diagrammatic cross section. It interleaves flatwise and flexibly between layers of insulated motor windings 29. Thus an efficient heat-exchange relationship can be obtained with the windings of various types of motors regardless of the comparatively small mass of the thermistor 1. In general, increase of the ratio of the heat-collecting surface areas afforded by the heads 13, 14 and 19 to the thermal mass of the thermistor to be heated is desirable. If the heat-collecting areas are too small, then the thermistor does not have enough heat delivered to it to drive its temperature up as rapidly as may be necessary closely to follow the rapidly rising winding temperature, so as to prevent overshoot. For example, good results are obtained by use of a thermistor 1 which is about .070″ in diameter and .050″ in length when used between conductive foil heads 19 approximately ½″ in diameter sandwiched between insulating heads 13 and 14 which are approximately 1⅛″ in diameter.

FIGS. 7–9 show diagrammatically why certain former efforts to reduce the size of cylindrical thermistors were unsatisfactory. As these figures show, thermistors of various diameters A, B and C make irregular and poor thermal contact with motor windings 29. Note particularly that the voids 31 between the thermistors and windings are of irregular size and shape. This irregular or inconsistent degree of contact between the thermistors and windings results in a substantial variation, known as "scatter effect," in the ability of the thermistors to follow a particular rate of temperature rise in the motor windings. While reduction in the mass of prior art thermistors of the forms shown in FIGS. 7–9 has generally enhanced the ability of the thermistors to follow more rapid rates of temperature rise in the motor windings, the reduction in mass of these thermistor forms has also increased the scatter effect of the thermistors. For example, when a thermistor of one of the prior art forms shown in FIGS. 7–9 is reduced in mass, the thermistor generally displays the ability to follow an increasingly faster rate of temperature rise in a motor winding as is illustrated by curve M in FIG. 10. However, when thermistors of this form are installed in other motors of the same design and rating, the thermistors may display significantly different abilities to follow rates of temperature rise in the windings as is illustrated by curves L and N in FIG. 10. These differences are due to the differences in degree of thermal contact between the thermistor and the motor winding in the respective installations. Thus thermistors of the same form having a mass of about 40 milligrams may, when actually installed in motor windings, display the ability to follow rates of winding temperature rise from 12° C. per sec. to about 19° C. per sec., a scatter effect of 7° C. per sec. When thermistors of this same form are reduced in mass to about 10 milligrams and are installed in the same motor windings, the thermistors may be able to follow rates of winding temperature rise from about 22° C. per sec. to about 35° C. per sec., as illustrated in FIG. 10, a scatter effect of about 13° C. per sec.

By means of the flexible flat construction of the motor protection sensor of this invention, more extensive and more consistent thermal contact between the thermistor sensor and a motor winding is obtained as is illustrated in FIG. 6. In the configuration of this invention, variations in the shape and size of voids at the interfacial engagement between the flat protection sensor and the motor winding are minimal and permit more uniform thermal contact between the sensor and the winding from installation to installation. As a result, the thermistor of this invention displays a significantly smaller scatter effect and can be more readily matched with a motor winding to assure that the thermistor sensor, when installed in the motor winding, will display the ability to follow a sufficiently rapid rate of winding temperature rise to provide protection for the motor winding.

In FIG. 11 the elapsed time for response to a signal (called the time constant) is plotted against the ratio of heat collecting thermistor surface area to thermistor mass. At point F is illustrated what result is to be expected from a prior art ratio, namely a time constant on the order of about 2.2 seconds, ignoring the question of scatter effect. At point G is indicated the result obtained from our device, namely a time constant on the order of 1.2 seconds. This is obtained with little or no scatter. In both cases the protection to be afforded is for windings of motors rated up to 35° C. per second rate-of-rise.

FIG. 11 also illustrates that our faster time constant at G is obtained with not too small a thermistor mass, which is advantageous. The smaller that a thermistor is, the smaller will be the heat-conductive cross section at the soldered connection therewith and if too small it becomes difficult to effect proper soldering or other heat connection and current-conductive connection with it. The resulting choke effect on heat flow contributes to the greater time constant at F. Thus there is a minimum to the low thermal inertia characteristic that can be given to the thermistor 1.

In addition to the advantages above set forth, the present device has advantages in fabrication. It is a simple matter to stamp out the perforated central layer 5 in the shape illustrated in FIG. 13. The layers 7, before any folding such as on line 9, may also be stamped out from a flat sheet S of insulating material having two leaves 7' and stems 11' which after folding become layers 7 respectively having the stems 11. The copper layers 15 are vapor-deposited on the leaves 7' (before folding) in two symmetrically arranged patterns as shown in FIG. 12. The tabs are then welded to the stems 17. The resulting sheet may then have adhesive applied to its margins and folded along line 9 to sandwich the central layer 5 after the thermistor has been located in its opening 3. Application of heat sets the adhesive.

The heat shrinkable sleeve 29, in cross-linked chemical and expanded physical condition, is applied to the outside of the insulation 23 behind the wire terminals 21 before any connection is made between these terminals and the tabs 25. Then the appropriate soldered connections are made between the terminals 21 and the tabs 25. The sleeve 27 is then slipped back into the position shown in FIGS. 1 and 2. Then when heat is applied it shrinks into the sealing condition shown, so as very effectively to seal the connections.

Another feature of the invention requires comment. The thin elongate stems 11, 16 and 17 widely separate the heat collecting heads 13 and 19 from the considerable mass of materials at the junction between the tabs 25 and the wire terminals 21. This junction and the connected wire may lie outside or near the outside of the motor windings between layers of which the sensitive part of the protector is located. Therefore the junction and wire may be subjected to ambient temperature different from that of the windings and have a tendency to abstract heat from or deliver heat to the heads 13 and 19, thereby changing the time constant. The thin elongate forms of the stems minimize this effect by reducing the cross section and extending the length of the heat-conducting path, thus choking heat flow through this path.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A sensor comprising a thermistor material having a selected temperature coefficient of resistance;
   an inner layer of flexible insulating material having an opening containing said thermistor and exposing portions thereof on opposite sides of said inner layer;
   outer layers of insulating material bonded to said inner layer;
   flexible foils of conductive material vapor-deposited on the insides of said outer layers, said foils having conductive connections with said exposed portions respectively of said thermistor;
   line terminals and conductive connections between said line terminals and said foils respectively.

2. A motor protection sensor made according to claim 1, wherein the thickness of each foil is in the range of .40–.75 mil.

3. A motor protection sensor made according to claim 2 wherein the thicknesses of said inner and outer layers are in the range of two to six mils.

4. A motor protection sensor made according to claim 1, wherein said conductive connections between the foils and the thermistor are a gold-tin eutectic solder and the sensing element is barium titanate in the form of a pellet in the range of .040″–.060″ in length and in range of .050″–.080″ in diameter.

5. A motor protection sensor according to claim 1, including an insulating sleeve shrunk around said connections and adjacent parts of the terminals and outer layers.

6. An electric motor protection sensor comprising a thermistor made of a material having a temperature coefficient of resistance which over a limited portion of its range changes more rapidly than elsewhere in the range;
   an inner layer of flexible insulating material having an opening containing said thermistor and exposing portions thereof on opposite sides of said inner layer;
   outer layers of insulating material bonded to said inner layer;
   individual flexible foils of copper vapor-deposited on the insides of said outer layers, said foils having conductive connections with said exposed portions respectively of said thermistor;
   line terminals, conductive connections between said line terminals and said foils of copper respectively;
   said foils each having a form comprising an elongate stem extending to one of said connections, each stem being terminated by an enlarged head over one end of said thermistor;
   each of said outer and inner flexible insulating layers having a form comprising a stem extending over a foil stem and terminated by a head which is substantially larger than and overlying an enlarged head of the foil and forming a substantially flexible head for the protector capable of effecting a substantially constant heat-exchange relationship with various windings of different motors.

7. A motor protection sensor according to claim 6, including a cross-linked insulating polymer material shrunk around said connections, around adjacent parts of the terminals and around the adjacent parts of the stems of said outer layers.

8. A motor protection sensor made according to claim 6, wherein the outer insulating layers are made of a folded sheet.

9. A motor protection sensor made according to claim 8, including a cross-linked insulating polymer material shrunk around said connections, around adjacent parts of the terminals and around the adjacent parts of stems of the outer layers.

10. A motor protection sensor according to claim 9, wherein said inner and outer layers are made of polyamide resin.

11. A motor protection sensor according to claim 10, wherein said sleeve is made of polyethylene terephthalate.

12. A motor protection sensor according to claim 11, including a polyester resin adhesive forming the bond between said inner and outer layers.

13. A motor protection sensor comprising a folded area of insulating material providing outer insulating layers sandwiching a layer of insulating material therebetween, said inner layer carrying a thermistor in an opening therein, separate conductive vapor-deposited foils on the insides of said outer layers, each foil conductively engaging one end of the thermistor, the outer layers being bonded to the inner layer around said foils, and motor-control-circuit leads connected with said foils.

14. A motor protection sensor according to claim 13, wherein the foils and sheets of insulating material are shaped with relatively broad head portions extending radially from and around the thermistor and with comparatively narrow stems extending therefrom to said leads.

References Cited

UNITED STATES PATENTS

| | | | |
|---|---|---|---|
| 2,717,945 | 9/1955 | Dresios et al. | 338—26 |
| 3,085,216 | 4/1963 | Melton | 338—28 |
| 3,422,313 | 1/1969 | Snoberger et al. | 318—473 |
| 3,441,893 | 4/1969 | Gordon et al. | 338—25 X |

RICHARD A. FARLEY, Primary Examiner

H. C. WAMSLEY, Assistant Examiner

U.S. Cl. X.R.

317—41; 318—473; 338—26, 28